(12) United States Patent
Lutaud et al.

(10) Patent No.: US 8,727,356 B2
(45) Date of Patent: May 20, 2014

(54) SEAL

(75) Inventors: Dominique Lutaud, Orbigny au Mont (FR); Fabrice Fougerolle, Saint-Maurice (FR)

(73) Assignee: Carl Freudenberg KG, Weinheim (DE)

( * ) Notice: Subject to any disclaimer, the term of this patent is extended or adjusted under 35 U.S.C. 154(b) by 1067 days.

(21) Appl. No.: 11/650,865

(22) Filed: Jan. 8, 2007

(65) Prior Publication Data

US 2007/0200300 A1 Aug. 30, 2007

(30) Foreign Application Priority Data

Jan. 10, 2006 (EP) .................................... 06000379

(51) Int. Cl.
*F16J 15/02* (2006.01)
(52) U.S. Cl.
USPC ........................................................ 277/553
(58) Field of Classification Search
USPC ........................................................ 277/553
See application file for complete search history.

(56) References Cited

U.S. PATENT DOCUMENTS

| | | | | |
|---|---|---|---|---|
| 2,589,766 A | * | 3/1952 | Bradley | 277/501 |
| 3,482,844 A | * | 12/1969 | McKinven, Jr. | 277/349 |
| 7,314,219 B1 | * | 1/2008 | Horvath et al. | 277/551 |
| 2004/0183702 A1 | | 9/2004 | Nachtigal et al. | |
| 2005/0275565 A1 | | 12/2005 | Nachtigal et al. | |

FOREIGN PATENT DOCUMENTS

| | | |
|---|---|---|
| DE | 26 21 352 | 5/1976 |
| GB | 2044167 A * | 10/1980 |
| JP | 2003065443 A * | 3/2003 |

\* cited by examiner

*Primary Examiner* — Vishal Patel
(74) *Attorney, Agent, or Firm* — Daniel J. Sepanik, Esq.; Harness, Dickey & Pierce, P.L.C.

(57) ABSTRACT

Seal (1) for sealing a shaft (2), comprising a supporting ring (3) and at least one sealing lip (4) made of polymeric material, the pressing of the sealing lip (4) against the shaft (2) taking place by magnetic interaction, the sealing lip (4) containing magnetizable particles (5).

13 Claims, 3 Drawing Sheets

SEAL

TECHNICAL FIELD

The invention relates to a seal for sealing a shaft, comprising a supporting ring and at least one sealing lip made of polymeric material, the pressing of the sealing lip against the shaft taking place by magnetic interaction.

PRIOR ART

Seals of this type are known from DE 26 21 352. The previously known seal has a supporting ring with a sealing lip fastened to it. The sealing lip has on the side facing away from the shaft a permanently magnetic layer, which is magnetized in such a way that one side face has one pole and the other side face has the other pole. The supporting ring has a further permanent magnet. The two permanent magnets cause intensified magnetic pressing of the sealing lip against the shaft to be sealed. The magnetically effected pressing permits reliable sealing even under dynamic stress. Leakages of the seal caused by relaxation of the sealing lip are prevented. Furthermore, there is no need for any spring elements, for example annular helical springs.

SUMMARY OF THE INVENTION

The invention is based on the object of providing a seal of the type mentioned at the beginning which can easily be produced and has a small number of parts.

The object is achieved by the features of claim 1. The subclaims relate to advantageous configurations.

To achieve the object, the sealing lip contains magnetizable particles. The magnetizable particles are firmly embedded in the material of the sealing lip and therefore cannot detach themselves from the sealing lip when they become worn. Production is particularly easy, since the particles can be added to the polymer, the shaping of the sealing lip taking place in a subsequent injection-moulding process. The magnetization of the particles may in this case take place before or after the injection-moulding. The subsequent magnetization can take place easily and inexpensively by means of a magnetizing tool that is known from encoder production. No further production steps are required for producing the sealing lip. In particular, there is no longer any need for measures for fastening magnetizable layers, which are particularly laborious in the case of some plastics often used in sealing technology. The particles are protected from external influences, for example aggressive media, by the embedding in the material of the sealing lip.

The particles may be formed by ferromagnetic particles. Ferromagnetic particles can be magnetized by simple means and permanently. In this case, the particles comprise nanoparticles with a diameter smaller than 50 nm. Small particles are homogeneously distributed in the polymer, whereby uniform magnetic properties are obtained.

The proportion of magnetizable particles in the sealing lip may be up to 50%. With higher proportions, the influence of the particles on the sealing effect, in particular the sliding properties of the sealing lip, increase greatly and with lower proportions there is an increase in the risk of leakage caused by weaker pressing on account of weaker magnetic forces.

The sealing lip may be formed in rubber or from PTFE and magnetizable particles. PTFE has favourable sliding properties and is resistant to many media.

The sealing lip may form a sealing sleeve, which is made to protrude. Protruded sealing sleeves, in particular made of PTFE, are easy to fit. The pressing by magnetic interaction is in this case particularly advantageous, since the pressing force produced by restoring forces of the sealing lip material is low in the case of protruded sealing lips.

Viewed in the circumferential direction, the sealing lip may have alternating north and south poles. The magnetization is easy to apply, since the magnetizing tool merely has to be placed on one side of the sealing lip. With suitable magnetization, for example a magnetized singularity at the circumference of the sealing lip, the latter can at the same time act as a transducer for an angle measuring device, which as a result is particularly compact and has few parts. The sensor for detecting the signals emitted by the magnetized portions is in this case arranged on the shaft and rotates with it.

One pole may be arranged on the outer circumference of the sealing lip and the other pole may be arranged on the inner circumference of the sealing lip. In the case of this configuration, the pressing of the sealing lip takes place continuously over the circumference. The magnetic field strength is constant over the circumference.

The seal may be formed as a unitized seal, the unitized seal having a mating ring against which the sealing lip bears with a sealing effect. Unitized seals are often used in machines that are exposed to particularly great contamination. The sealing lip is in this case arranged between the supporting ring and the mating ring and, as a result, is encapsulated and protected against contamination, in particular by coarse particles. The sealing lip thereby bears against the mating ring, whereby the pressing force is produced by magnetic interaction between the sealing lip and the mating ring. This is particularly advantageous in the case of use on shafts with poor magnetic properties, for example shafts made of certain high-grade steel alloys, since the pressing force produced by magnetic interaction would be insufficient in the case of these shafts.

The portion of the sealing lip that is in contact with the mating ring may have a different polarity than the portion of the mating ring that is in contact with the sealing lip. As a result, the pressing effect of the sealing lip against the mating ring is increased. In the same way as the sealing lip, the mating ring, produced from a metallic material, can be magnetized by simple means.

BRIEF DESCRIPTION OF THE DRAWING

A number of exemplary embodiments of the seal according to the invention are explained in more detail below on the basis of the figures, in which.

IMPLEMENTATION OF THE INVENTION

Figure 1:
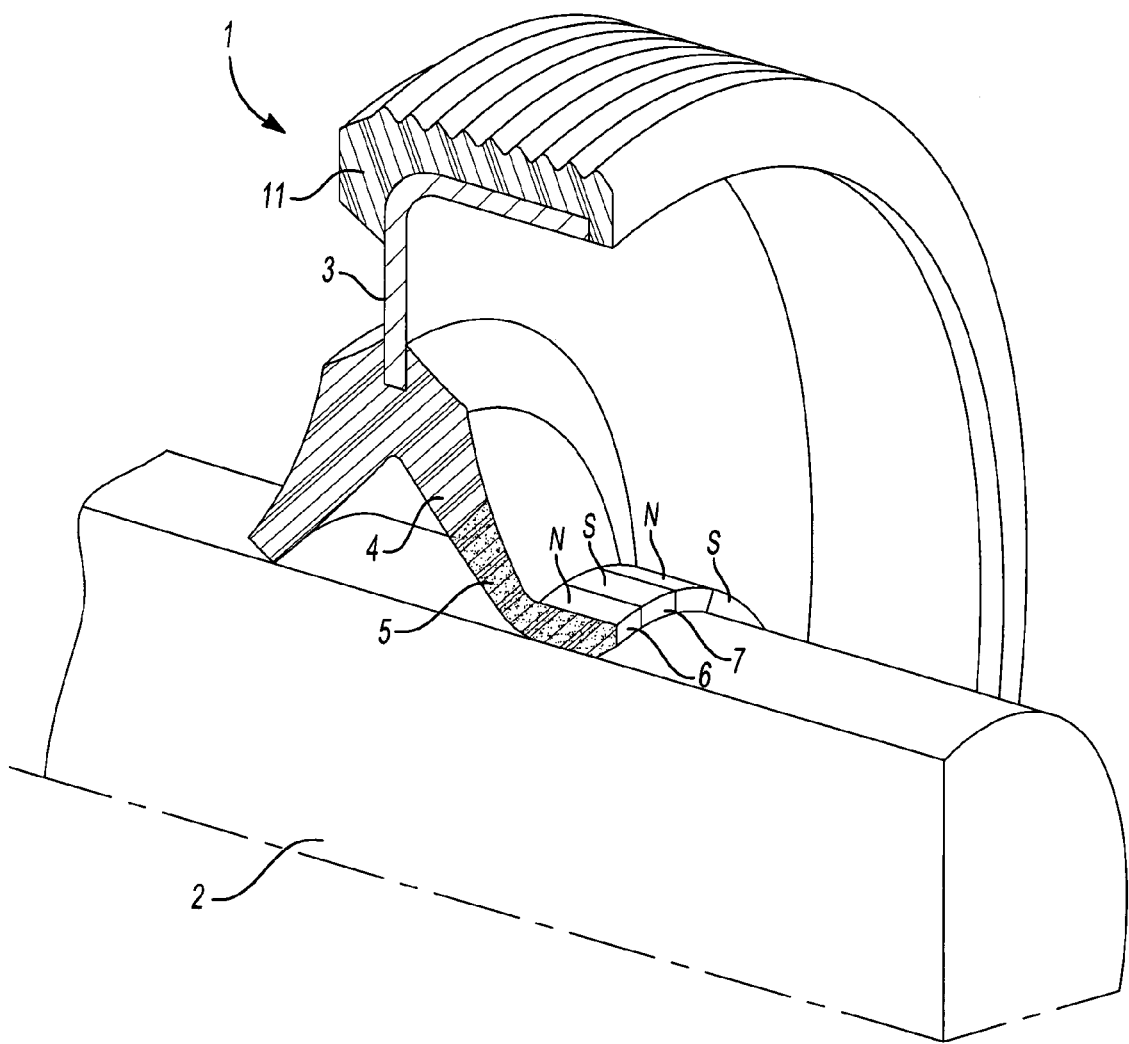
FIG. 1 schematically shows a radial shaft sealing ring with a magnetized sealing lip.

FIG. 1 shows a seal 1, which is formed as a radial shaft sealing ring and serves for sealing a shaft 2. The seal 1 has a supporting ring 3, which comprises a punched metal part. Fastened to the supporting ring 3 is a sealing lip 4 for dynamically sealing the shaft 2 and a static seal 11 for sealing the housing bore. The sealing lip 4 is made to protrude in a flared manner, the protruded form having been imparted to the sealing lip 4 already before it is put to the intended use. The static seal 11 and the dynamically sealing sealing lip 4 are formed from a polymeric material. The sealing lip 4 is in this case formed from rubber and may partially be given by rubber elongation and comprises ferromagnetic particles 5 in a proportion of 30% to 50%. The average diameter of the particles 5 is 30 nm. The sealing lip 4 with the particles 5 was magnetized on a magnetizing tool, so that pressing of the sealing lip 4 against the shaft 2 takes place by magnetic interaction. In this configuration, the magnetization took place by the sealing lip 4 having, viewed in the circumferential direction, alternately north poles 6 and south poles 7. In this configuration, the sealing lip 4 can also act as a transducer.

Figure 2:
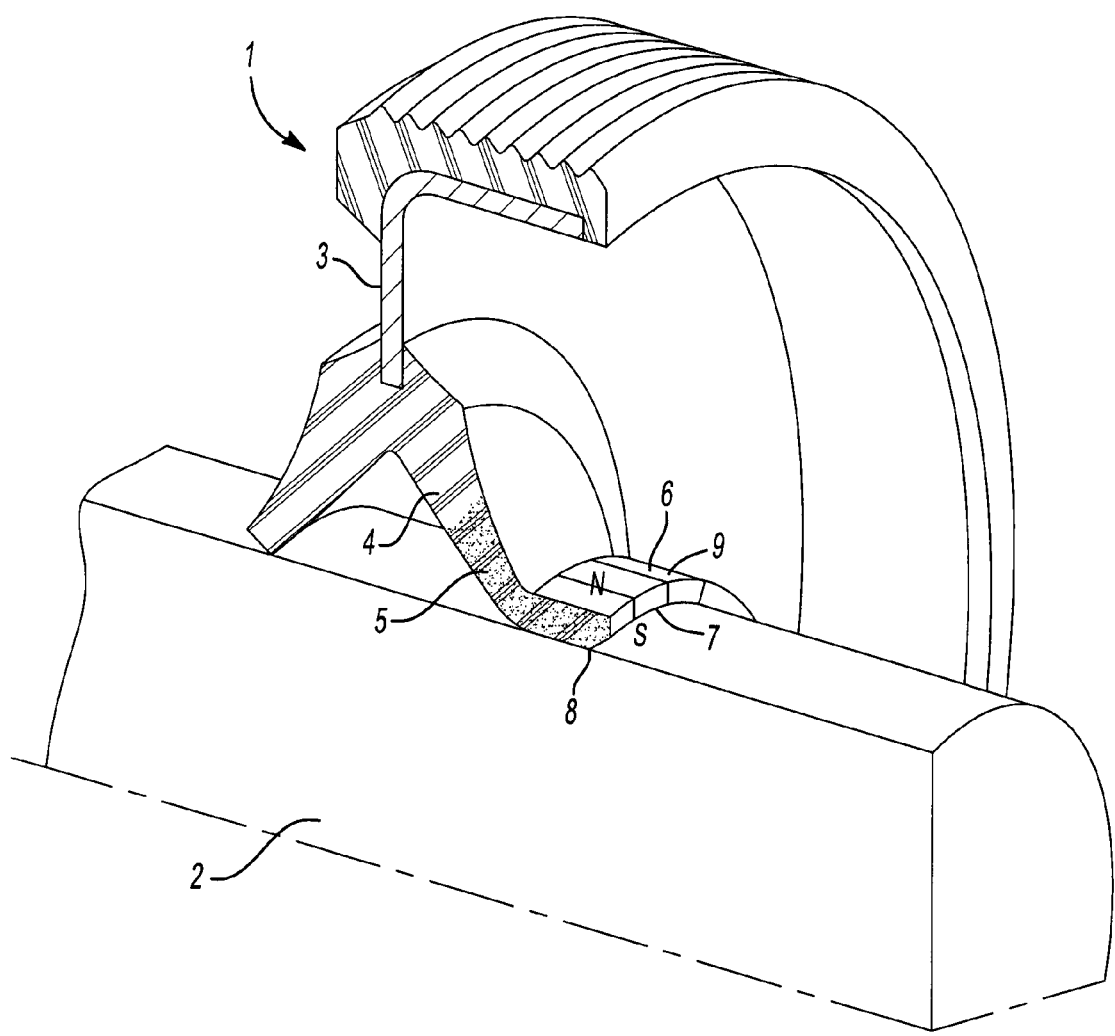
FIG. 2 schematically shows a radial shaft sealing ring with a magnetized sealing lip.

FIG. 2 shows a seal 1 according to FIG. 1, the magnetization in this configuration taking place in such a way that the north or south pole 6, 7 is arranged on the outer circumference 8 of the sealing lip 4 and the corresponding other pole 6, 7 is arranged on the inner circumference 9 of the sealing lip 4.

Figure 3:
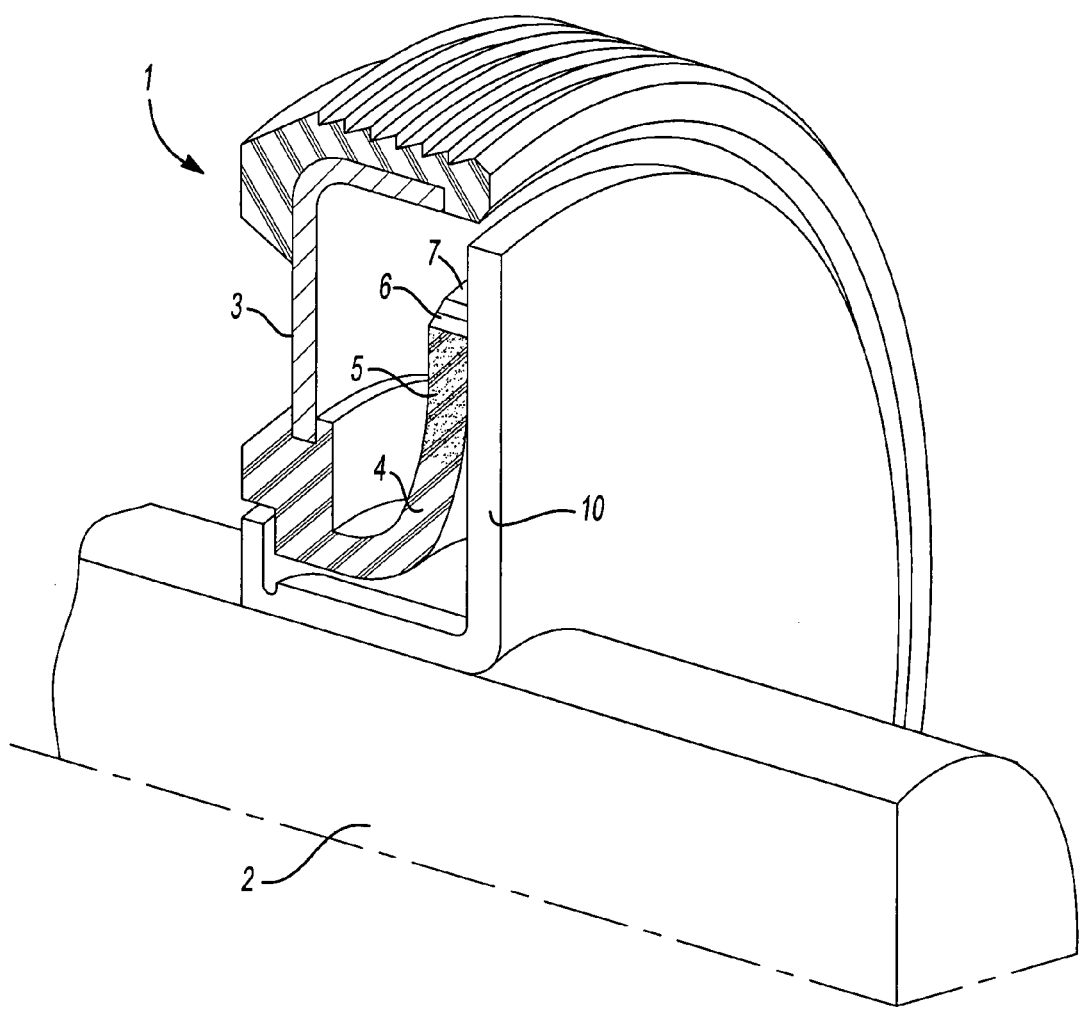
FIG. 3 schematically shows a unitized seal with a magnetized sealing lip.

FIG. 3 shows a seal 1, which is formed as a unitized seal. The seal 1 has a supporting ring 3 and a mating ring 10, which comprises a punched metal part. Fastened to the supporting ring 3 is a sealing lip 4 for dynamically sealing the shaft 2 and a static seal 11 for sealing the housing bore. In this case, the sealing lip 4 bears against the radial extending mating ring 10 of the seal 1. The mating ring 10 is fastened on the shaft 2 in a rotationally fixed and sealing manner. The static seal 11 and the dynamically sealing sealing lip 4 are formed from a polymeric material. The sealing lip 4 is in this case formed from rubber and comprises ferromagnetic particles 5 in a proportion of 30% to 50%. The average diameter of the particles 5 is 30 nm. The sealing lip 4 with the particles 5 was magnetized on a magnetizing tool, so that pressing of the sealing lip 4 against the mating ring 10 takes place by magnetic interaction. In this case, the sealing lip 4 has circumferential alternating arranged poles 6, 7. In another case, the side of the sealing lip 4 facing towards the mating ring 10 has a different pole 6, 7 than the side facing away from the mating ring 10. In a further configuration, the mating ring 10 may be additionally magnetized, the portion of the sealing lip 4 that is in contact with the mating ring 10 having a different polarity than the portion of the mating ring 10 that is in contact with the sealing lip 4.

The invention claimed is:

1. A seal for sealing a shaft, comprising:
a supporting ring;
a dynamic seal having a sealing lip consisting of a polymeric material and magnetizable particles attached to said supporting ring, said magnetizable particles providing said sealing lip with alternating magnetic polarities; and
a mating ring adapted to be attached to the shaft, said sealing lip directly contacting said mating ring;
wherein pressing of said sealing lip against said mating ring takes place by magnetic interaction; and
said magnetizable particles are dispersed throughout a length of said sealing lip that contacts said mating ring, and dispersed throughout an entire thickness of said length of said sealing lip that contacts said mating ring.

2. The seal according to claim 1, wherein the particles are formed of ferromagnetic particles.

3. The seal according to claim 1, wherein a proportion of the magnetizable particles in the sealing lip is up to 50%.

4. The seal according to claim 1, wherein the sealing lip is formed from rubber and magnetizable particles.

5. The seal according to claim 1, wherein the sealing lip forms a sealing sleeve, which is made to protrude.

6. The seal according to claim 1, wherein, viewed in the circumferential direction, the alternating magnetic polarities of the sealing lip include alternating north poles and south poles.

7. The seal according to claim 1, wherein the alternating magnetic polarities each include one pole that is arranged on an outer circumference of the sealing lip and another pole that is arranged on an inner circumference of the sealing lip.

8. The seal according to claim 1, wherein a portion of the sealing lip that is in contact with the mating ring has a different polarity than a portion of the mating ring that is in contact with the sealing lip.

9. The seal according to claim 1, wherein the sealing lip is deformed in radial direction relative the shaft away from the shaft.

10. The seal according to claim 1, further comprising a static seal attached to the supporting ring separate and apart from the dynamic seal.

11. The seal according to claim 1, wherein the dynamic seal includes a portion having a first contour that corresponds to a second contour of a portion of the mating ring.

12. The seal according to claim 11, wherein the first contour and the second contour are separated by a gap.

13. The seal of claim 1, wherein said particles are nanoparticles.

* * * * *